United States Patent
Baheti

(10) Patent No.: US 9,927,033 B2
(45) Date of Patent: Mar. 27, 2018

(54) SPLIT CIRCUMFERENTIAL LIFT-OFF SEAL SEGMENT

(71) Applicant: Sanjay Kumar Baheti, Brookeville, MD (US)

(72) Inventor: Sanjay Kumar Baheti, Brookeville, MD (US)

(73) Assignee: KAYDON RING & SEAL, INC., Baltimore, MD (US)

( * ) Notice: Subject to any disclaimer, the term of this patent is extended or adjusted under 35 U.S.C. 154(b) by 52 days.

(21) Appl. No.: 14/753,286

(22) Filed: Jun. 29, 2015

(65) Prior Publication Data
US 2016/0377181 A1 Dec. 29, 2016

(51) Int. Cl.
*F16J 15/44* (2006.01)
*F16J 15/34* (2006.01)

(52) U.S. Cl.
CPC ....... *F16J 15/3448* (2013.01); *F16J 15/3488* (2013.01); *F16J 15/441* (2013.01); *F16J 15/442* (2013.01)

(58) Field of Classification Search
CPC ...... F16J 15/3244; F16J 15/3488; F16J 15/44; F16J 15/441; F16J 15/442
See application file for complete search history.

(56) References Cited

U.S. PATENT DOCUMENTS

| | | | |
|---|---|---|---|
| 3,575,424 A | 4/1971 | Taschenberg | |
| 3,640,541 A | 2/1972 | Taschenberg | |
| 4,082,296 A | 4/1978 | Stein | |
| 4,145,058 A | 3/1979 | Hady et al. | |
| 4,406,466 A * | 9/1983 | Geary, Jr. ............ | F16J 15/3412 277/347 |
| 4,546,985 A | 10/1985 | Forch | |
| 5,066,026 A | 11/1991 | Heck et al. | |
| 5,145,189 A | 9/1992 | Pope | |
| 5,169,159 A | 12/1992 | Pope et al. | |
| 5,174,584 A * | 12/1992 | Lahrman ............. | F16J 15/3412 277/400 |
| 5,301,957 A | 4/1994 | Hwang et al. | |
| 5,368,313 A * | 11/1994 | Hudson ............... | F16J 15/4472 277/422 |
| 5,447,316 A * | 9/1995 | Matsui ................ | F16J 15/3412 277/400 |
| 5,509,664 A | 4/1996 | Borkiewicz | |
| 6,692,006 B2 * | 2/2004 | Holder ................. | F16J 15/442 277/346 |
| 7,540,501 B2 | 6/2009 | Flaherty | |

(Continued)

*Primary Examiner* — Nicholas L Foster
(74) *Attorney, Agent, or Firm* — Mark Ussai; SKF USA Inc. Patent Dept.

(57) ABSTRACT

A circumferential shaft seal segment has radial inner and outer faces and first and second axial faces, and at least one feed slot in the radial inner face extending from the first axial face toward the second axial face. At least one recess extends from the at least one feed slot and has first and second axially spaced side walls, a bottom between the side walls, a first end at the feed slot and a second end circumferentially spaced from the feed slot. The recess includes a first portion extending from the first end and a second portion extending from the second end, and a radial depth of the first portion is a first function of a distance from the feed slot and a radial depth of the second portion is a second, different, function of the distance from the feed slot.

15 Claims, 8 Drawing Sheets

(56) References Cited

U.S. PATENT DOCUMENTS

| | | |
|---|---|---|
| 7,770,895 B2 | 8/2010 | Zheng et al. |
| 7,914,007 B2 * | 3/2011 | Berard .................. F16J 15/442 |
| | | 277/543 |
| 7,931,277 B2 | 4/2011 | Garrison |
| 7,963,525 B1 | 6/2011 | Garrison |
| 8,074,995 B2 * | 12/2011 | Vasagar ............... F16J 15/3244 |
| | | 277/301 |
| 8,091,898 B2 | 1/2012 | Garrison |
| 8,272,643 B2 | 9/2012 | Garrison et al. |
| 8,408,556 B2 | 4/2013 | Vasagar et al. |
| 8,905,407 B2 | 12/2014 | Ruggeri et al. |
| 9,638,326 B2 * | 5/2017 | Haynes .................. F16J 15/26 |
| 2003/0071422 A1 * | 4/2003 | Holder .................. F16J 15/442 |
| | | 277/348 |
| 2008/0272552 A1 * | 11/2008 | Zheng .................. F16J 15/442 |
| | | 277/400 |
| 2010/0164183 A1 | 7/2010 | Berard et al. |
| 2012/0223490 A1 * | 9/2012 | Ruggeri ................ F16J 15/442 |
| | | 277/632 |
| 2014/0197675 A1 | 7/2014 | Morman et al. |
| 2014/0325791 A1 | 11/2014 | Colverson et al. |
| 2015/0167846 A1 | 6/2015 | Haynes et al. |
| 2016/0169389 A1 * | 6/2016 | Haynes ................. F16J 15/442 |
| | | 277/544 |

\* cited by examiner

SPLIT CIRCUMFERENTIAL LIFT-OFF SEAL SEGMENT

FIELD OF THE INVENTION

The present invention is directed toward a segment of a lift-off circumferential shaft seal and a lift-off circumferential shaft seal formed from a plurality of the segments which shaft seal is mountable on a rotatable shaft, and, more specifically, toward a segment of a lift-off circumferential shaft seal and a lift-off circumferential shaft seal formed from a plurality of the segments which shaft seal is configured to provide lift both when a gap between the shaft and the seal is filled with gas and when the gap contains liquid and gas.

BACKGROUND OF THE INVENTION

Various seal devices are known for forming a seal between a rotatable shaft, or a sleeve or runner mounted on a rotatable shaft, and a housing or other structure surrounding the shaft. One type of seal, sometimes referred to as a contact circumferential shaft seal, is very effective in controlling leakage. Such seals include one or more seal rings with circumferential inner faces that contact the rotating shaft and slide against the shaft while it rotates. These seals may be formed from compacted and sintered carbon graphite to provide heat and wear resistance, and they are often formed as a plurality of interconnectable ring segments to facilitate installation about the shaft. The seal rings are held in place by a suitable retaining device and may include a biasing device, such as a circumferential or garter spring, for holding the seal segments together.

While carbon seal rings are durable and capable of withstanding high levels of heat and friction, sliding contact with a rotating shaft eventually causes the rings to wear out. The wear rate is accelerated as the seal gas pressure is increased. The desire for longer operating life and higher thermal efficiency has therefore moved the seal industry to look for alternatives to circumferential contact seals.

One conventional alternative to contact seals are solid seals that are always spaced a small distance from the rotating shaft. These seals never contact the moving shaft and therefore do not wear like contact seals. However, because there is always a small gap between the seal and the shaft, a relatively large amount of leakage through the seal occurs, especially at high pressures.

Another alternative to circumferential contact seals is a circumferential gas film seal. Much like the circumferential contact seal, this seal includes one or more carbon seal rings that exert a very light contact force against the shaft when it is not rotating. The seal ring lifts-off the shaft or sleeve when the shaft is rotating. The lift-off is achieved by routing high pressure gas to opposing faces of the seal through clearance spaces and milled cutouts. In the case of a contacting circumferential seal, the outer diameter of the ring is exposed across its entire width while the inside diameter is exposed across its entire width excluding the width of a small sealing dam across which there is a pressure breakdown. This creates an imbalance in force that causes the seal to stay in contact with the shaft. Producing a force balanced contact in this manner is referred to hydrostatic sealing, and a hydrostatic seal can be maintained both when the shaft is rotating and when the shaft is stationary. Alternately or in addition, hydrodynamic sealing can be produced by forming recesses or cutouts on the side of the seal ring that faces the shaft. As the shaft rotates, gas entrained by the rotating shaft is compressed in these cutouts, and as the gas escapes over the non-recessed "pads" between the recesses, it produces an additional pressure and flow of gas for maintaining a separation between the seal ring and the shaft. Circumferential gas film seals generate less friction and less heat than circumferential contact seals, and thus generally last longer, require less maintenance and less external cooling than contact seals.

Circumferential gas film seals are useful in environments where a small amount of gas passes continuously between the seal and the shaft which leaking gas provides the hydrodynamic balancing discussed above. Steam turbines include rotating shafts that required sealing and could benefit from circumferential gas film seals. However, such seals have heretofore not been used for steam turbines. This is partly because the material passing between the seal and the rotating shaft is not always a gas. At operating speeds and temperatures, the material passing between the shaft and seal is high temperature steam. However, under certain other operating conditions, including at startup, the steam may be in the condensed liquid form, and the presence of this liquid or condensate around the seal may prevent or significantly interfere with optimal or successful non-contacting seal performance as discussed above. It would therefore be desirable to provide a circumferential seal that can operate efficiently under the conditions present at the shaft/seal interface of a steam turbine or in other environments in which the material passing between the seal and shaft is not always entirely in a gaseous state.

SUMMARY OF THE INVENTION

These problems and others are addressed by embodiments of the present invention, a first aspect of which comprises a circumferential shaft seal segment having a radial outer face, a radial inner face, a first axial face extending from the radial outer face toward the radial inner face and a second axial face axially spaced from the first axial face and extending from the radial outer face toward the radial inner face. The segment includes at least one feed slot in the radial inner face that extends from the first axial face toward the second axial face and at least one recess in the radial inner face that extends from the at least one feed slot. Each of the at least one recess has first and second axially spaced side walls, a bottom between the side walls, a first end at the feed slot and a second end circumferentially spaced from the feed slot. The recess includes a first portion extending from the first end and a second portion extending from the second end, and a radial depth of the first portion is a first function of a distance from the feed slot, and a radial depth of the second portion is a second, different, function of the distance from the feed slot.

Another aspect of the disclosure comprises a circumferential shaft seal segment having a radial outer face, a radial inner face, a first axial face extending from the radial outer face toward the radial inner face and a second axial face axially spaced from the first axial face and extending from the radial outer face toward the radial inner face. The segment includes at least one feed slot in the radial inner face that extends from the first axial face toward the second axial face and at least one ramp in the radial inner face that extends from the at least one feed slot. Each of the at least one ramp has first and second axially spaced side walls, a bottom between the side walls, a first end at the feed slot and a second end circumferentially spaced from the feed slot. The at least one ramp includes a first ramp portion extending from the first end and a second ramp portion extending from the second end, and the first ramp portion has a first slope and the second ramp portion has a second slope different than the first slope.

A further aspect of the disclosure comprises a circumferential shaft seal segment having a radial outer face, a radial inner face, a first axial face extending from the radial outer face toward the radial inner face, and a second axial face axially spaced from the first axial face and extending from the radial outer face toward the radial inner face. The segment includes at least one feed slot in the radial inner face extending from the first axial face toward the second axial face, and the radial inner face includes means for generating lift that extend circumferentially from each of the at least one feed slot.

BRIEF DESCRIPTION OF THE DRAWINGS

These and other aspects and benefits of the present disclosure will be better understood after a reading of the following detailed description together with the attached drawings wherein.

DETAILED DESCRIPTION

Figure 1:
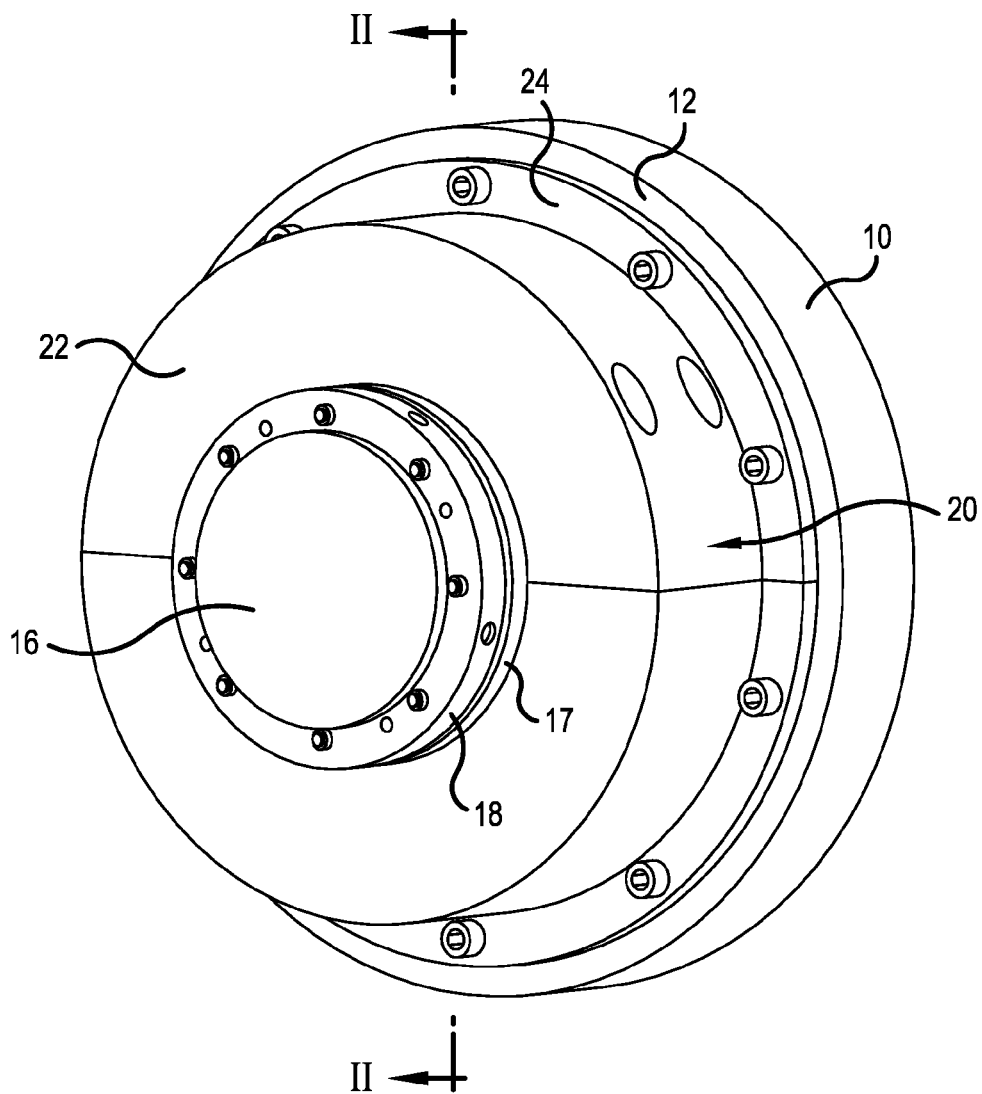
FIG. 1 is a perspective view of a steam turbine shaft exiting a steam turbine and passing through a seal according to an embodiment of the present disclosure.
Figure 2:
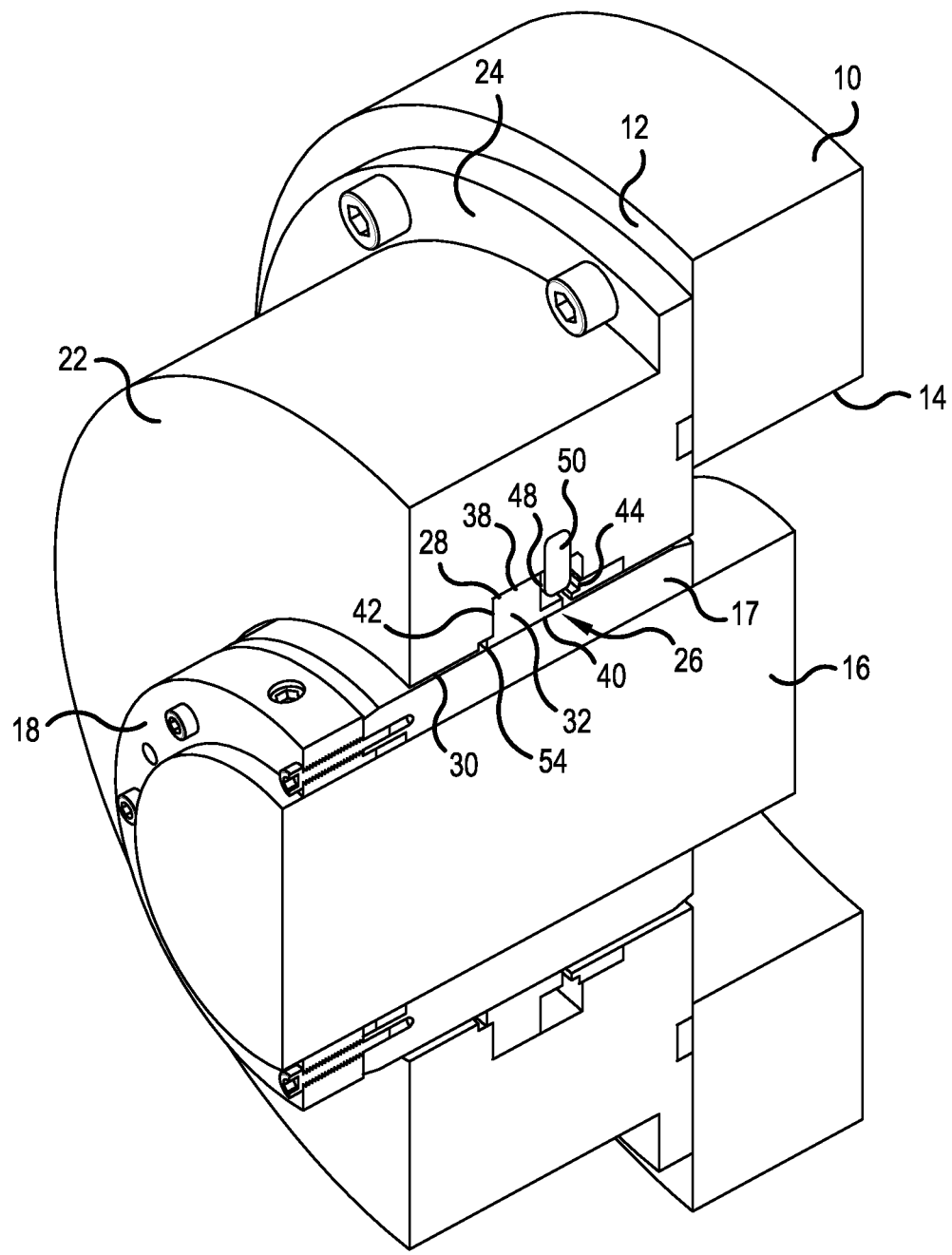
FIG. 2 is a sectional perspective view taken along line II-II in FIG. 1.

Referring now to the drawings, wherein the showings are for purposes of illustrating presently preferred embodiments of the invention only and not for limiting same, FIGS. 1 and 2 show a steam turbine housing 10 having an end wall 12 with an opening 14 through which a rotatable shaft 16 projects. The steam turbine causes the shaft 16 to rotate in a conventional manner not relevant to the present disclosure. A wear-resistant runner or sleeve 17 is mounted on the shaft 16 near the opening 14 and held in place by a runner clamp 18. The steam turbine housing 10 must retain steam under pressure, and a seal is needed to limit the rate at which the steam leaks from the turbine housing 10. To this end, a seal assembly 20 is provided to form a seal between the sleeve 17 and the turbine housing 10 and is described in greater detail below. Although not separately described, the seal assembly 20 could also be used to form a seal directly with a shaft surface that does not include a sleeve 17.

Figure 3:
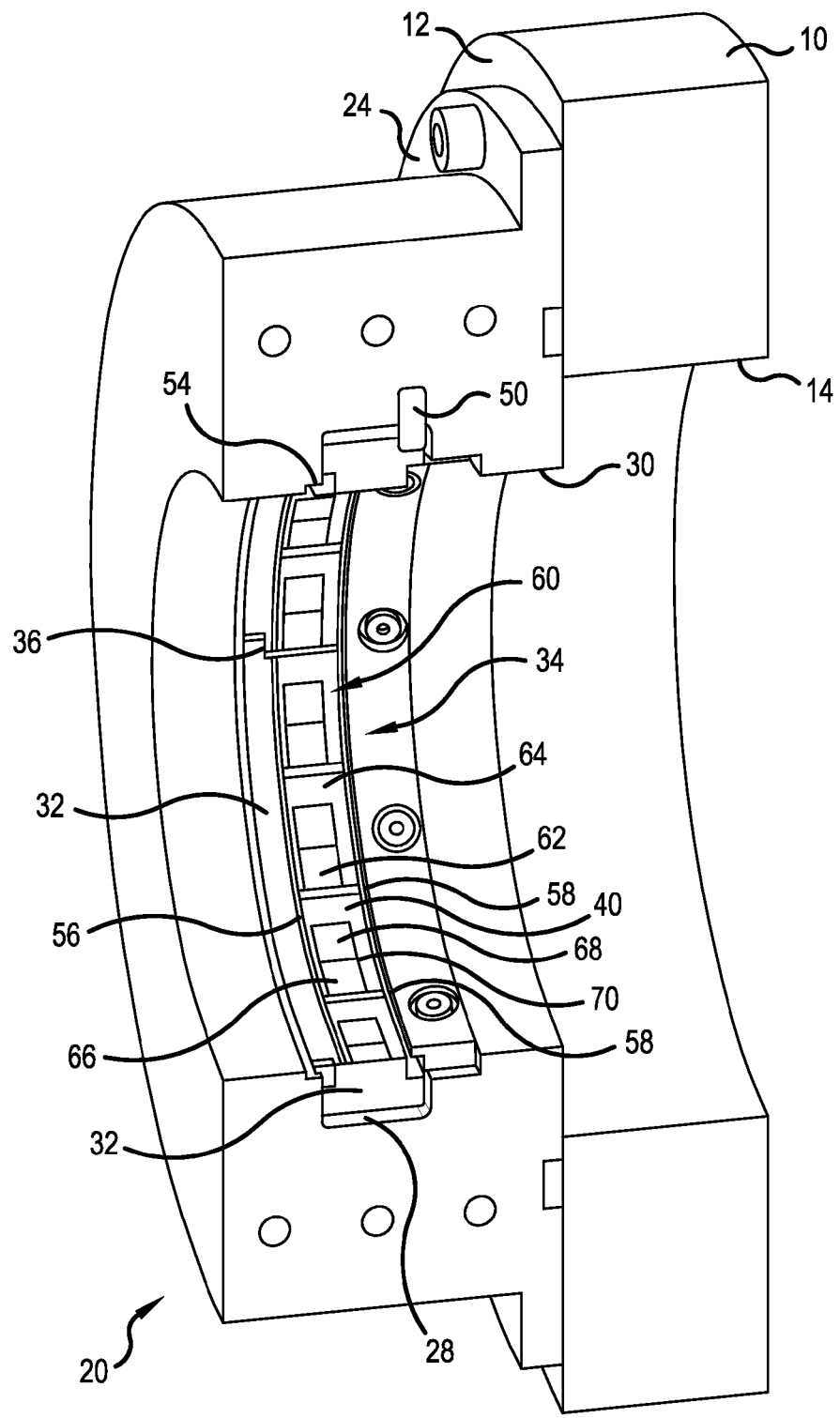
FIG. 3 is a modified version of FIG. 2 with the shaft and runner removed to show seal segments in the seal housing.

The seal assembly 20 includes a seal housing 22 having a flange 24 mounted to the end wall 12 of the steam turbine housing 10, and the seal housing 22 circumferentially surrounds the sleeve 17 and is spaced therefrom by a gap 26. As illustrated in FIGS. 2 and 3, the seal housing 22 includes a circumferential channel 28 in a radial inner face 30 of the seal housing 22 configured to retain a plurality of shaft seal segments 32 that form a seal ring 34 as shown in FIG. 3 and associated elements described in greater detail below.

Figure 4:
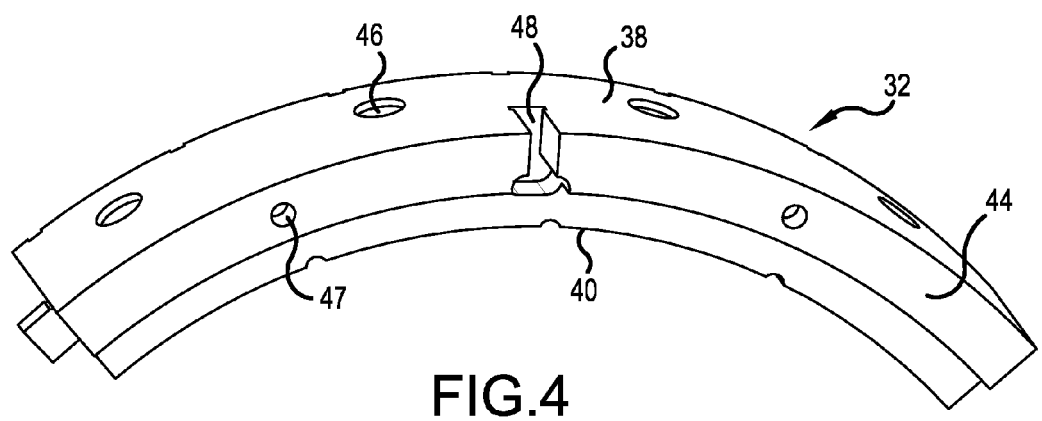
FIG. 4 is a perspective view of one of the seal segments of FIG. 3 viewed from the steam turbine side of the seal segment.
Figure 5:
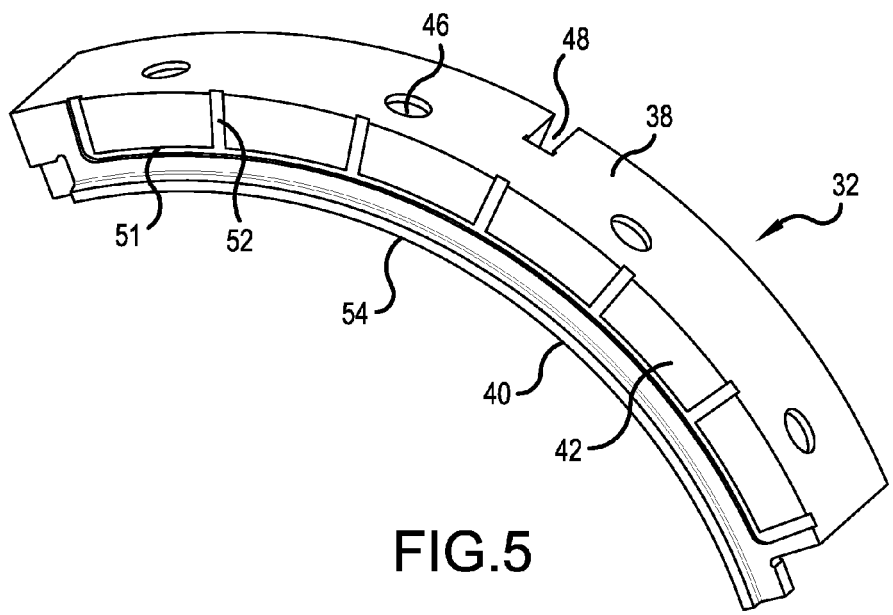
FIG. 5 is a perspective view of the seal segment of FIG. 4 viewed from the exit side of the seal segment.

Referring now to FIGS. 4 and 5, the seal ring 34 is formed of a plurality of the individual arc-shaped seal segments 32, four 90 degree segments, for example, suitably interconnected at joints 36. Two of the segments 32 and a joint 36 therebetween can be seen, for example, in FIG. 3. The terms "axial," "radial" and "circumferential" may be used when describing individual seal segments 32, and these terms should be understood to refer to the same directions as they would when the segments 32 are assembled into a seal ring 34. That is, the outwardly curved side of a seal segment 32 may be referred to as an "outer circumferential side" of the seal segment 32 as if the seal segment 32 were part of a complete seal ring 34 having a circumference even when only one arc-shaped seal segment 32 is being discussed.

Each of the seal segments 32 has a radial outer side 38, a radial inner side 40, an axial outer side 42 and an axial inner side 44. The axial inner side 44 is intended to face the steam turbine housing 10 when the seal ring 34 is installed for use; the axial outer side 42 is intended to face away from the steam turbine housing 10 when the seal ring 34 is installed for use. The radial outer side 38 of each seal segment 32 includes a plurality of bores 46 configured to receive compression springs (not illustrated) for pressing each seal segment 32 radially inwardly toward the shaft 16 or sleeve 17. The axial inner side 44 includes bores 47 for receiving additional compression springs (not illustrated). Slots 48 also extend into the radial outer side 38, which slots 48 are also open at the axial inner side 44. These slots 48 are each configured to receive an anti-rotation pin 50, illustrated in FIG. 2, to fix the shaft seal 34 rotationally relative to the seal housing 22.

The axial outer side 42 of each seal segment 32 includes a circumferential groove 51 and a plurality of radial grooves 52 which function to guide gas or liquid around the seal segment 32 and improve hydrodynamic balancing. The radial outer side 38 also includes a lip 54 which projects outwardly past the plane of the radial outer side 38 as can be seen, for example, in FIGS. 2 and 3. This lip 54 increases the surface area of the radial inner side 40 of the seal ring 34 and makes that surface areas greater than the surface area of the radial outer side 38 of the seal 34. The increased surface area reduces the net radially inward hydrostatic seating load which is essential in obtaining proper lift-off in dynamic condition under higher pressures.

Figure 6:
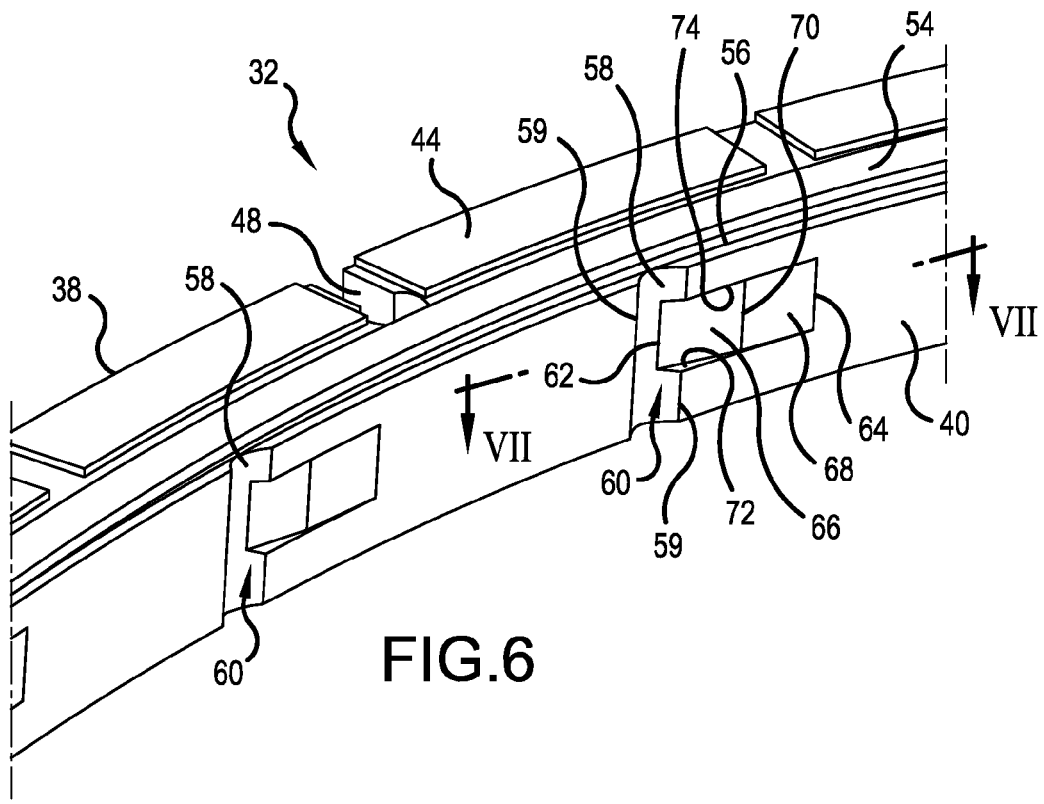
FIG. 6 is a perspective detail view of a portion of the radially inner side of the seal segment of FIG. 4.

FIG. 6 illustrates a portion of the radial inner side 40 of one of the seal segments 32. The radial inner side 40 includes a circumferential groove 56 near the axial outer side 42 of the seal segment 32 and a plurality of feed slots 58 that extend from the axial inner side 44 to the circumferential groove 56. Each of the feed slots 58 has first and second axial edges 59 at the radial inner face of the segment 32. A recess 60 extends circumferentially from each of the feed slots 58, and each recess 60 is generally centered between the first axial side 38 and the second axial side 44 of the seal segment 32.

Each of the recesses 60 has a first end 62 at the feed slot 58, a second end 64 circumferentially spaced from the first end 62, a substantially planar first ramp 66 that extends from the first end 62 and a substantially planar second ramp 68 that extends from the second end 64. The first ramp 66 and the second ramp 68 meet at a transition region 70.

The first and second ramps 66, 68 of the recesses 60 are described herein as being "substantially planar." The phrase "substantially planar" as used herein is intended to cover flat surfaces that are actually planar, that is, actually lie entirely in a plane as well as surfaces that may have a slight curvature produced by the tool used to form the substantially planar surface. For example, a cutting disk having a circular outer surface may produce first and second ramps of the recesses that are slightly convex, that is, slightly curved toward the outer radial surface 38 of the seal segment 34. This curvature is likely to be unnoticeable to the naked eye, and such slightly curved surfaces are intended to be included in the phrase "substantially planar." To the extent that the discussion herein defines an angle relative to the first and second substantially planar surfaces, this angle should be measured between a plane that includes the circumferentially spaced ends of the first ramp 66 or a plane that includes the circumferentially spaced ends of the second ramp 68. Furthermore, "circumferentially spaced" as used herein is intended to cover two points in the seal segment that are at different distances from an end of the seal segment even if these two points do not lie on a circle concentric to the seal ring 34. Thus, the first end 62 and the second end 64 of the recess 60 are circumferentially spaced even though the second end 64 lies radially inward of the first end 62.

The recesses 60 each have a first side wall 72 and a second side wall 74 parallel to and axial spaced from the first side wall 72 which side walls 72, 74 extend radially. The first side wall 72 is located axially inward of the axial inner side 44, and the second side wall 74 is located axial inward of the axial outer side 42.

Figure 7:
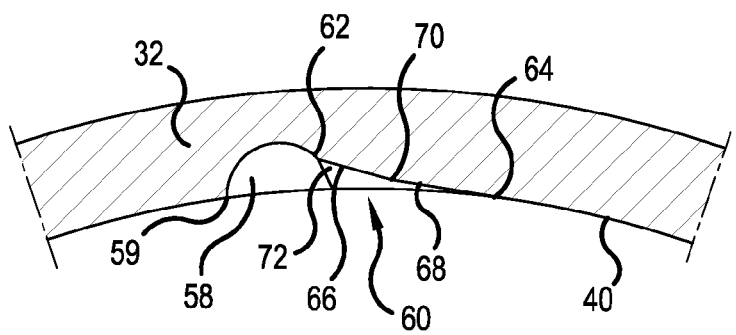
FIG. 7 is a sectional view taken along line VII-VII in FIG. 6.

In the embodiment of FIGS. 6 and 7, the circumferential length of the first ramp 66 is substantially the same as the circumferential length of the second ramp 68. As best seen in FIG. 7, the first ramp 66 is angled relative to, that is, not coplanar with, the second ramp 68. As used herein, all angles are measured relative to a plane (not illustrated) tangent to the inner circumference of the seal element 32 at the edge 59 of the recess 60. For example, the first ramp 66 may form an angle of about 0.5° to 3.0° with that plane while the second ramp 68 may form an angle of about 0.1° to 1.5° with that plane. Stated differently, the depth of the first ramp 66 of the recess 60 relative to the radial inner side 40 of the seal segment 32 varies (decreases) as a first function of distance from the feed slot 58, and the depth of the second ramp 68 of the recess 60 varies (decreases) as a second, different, function of distance from the feed slot 58. A further way of expressing the different angles is to say that the slope of the first ramp 66 is different than the slope of the second ramp. The angles, slopes and/or functions all change at the transition portion 70. For example, the depth of the first ramp 66 at the feed slot 58 may be about 0.002 to 0.017 inches while the depth of the transition portion 70 may be about 0.0005 to 0.007 inches. While the specific dimensions will depend on the diameter of the seal ring and the environment in which it is used, a typical depth of the feed slot is about 0.023 inches. Therefore, it will be appreciated that the feed slot 58 is deeper than even the deepest portion of the recess 60. A typical circumferential length of each recess 60 from the feed slot 58 to the second end 64 is about 0.6 inches.

The recesses 60 in the radial inner side 40 of the seal segments 32 generate lift when the shaft 16 (or sleeve 17) rotates inside and in close proximity to the seal 34. This is because steam exiting from the turbine housing 10 is entrained by the rotating shaft or sleeve and driven into the recesses 60. The decreasing depth of the recesses 60 increases the pressure in the recess 60 as more steam is driven thereinto, and this pressure exerts a radially outward pressure on the ring segments 32 lifting them off the shaft 16 (or sleeve 17) sufficiently far to reduce or substantially eliminate friction while at the same time keeping the gap 26 small enough to maintain steam leakage at an acceptably low level. The different angles or slopes of the two ramps 66, 68 of the recess enable a seal 34 formed of the seal segments 32 to provide desired amounts of lift both when the material exiting through the gap 26 is all in a gas state, e.g., steam, and when some liquid or condensate is present in or forms in the gap 26, which can occur under certain operating conditions in the steam turbine. The slope of the first ramps 66 of the recesses 60 is selected to provide a desired level of lift when liquid is present in the gap 26, and the slope of the second ramp 68 of the recess is selected to provide a desired level of lift when only gas is present in the gap 26. The presence of the first ramps 66 of the recesses 60 should not adversely affect the operation of the seal 34 when only gas is present in the gap 26, and the presence of the second ramps 68 of the recesses 60 should not adversely affect the operation of the seal 34 when liquid is present in the gap 26. However, the use of two different ramp configurations enables the seal to function over all operating pressures and temperatures of the steam turbine, including at start up.

Figure 8:
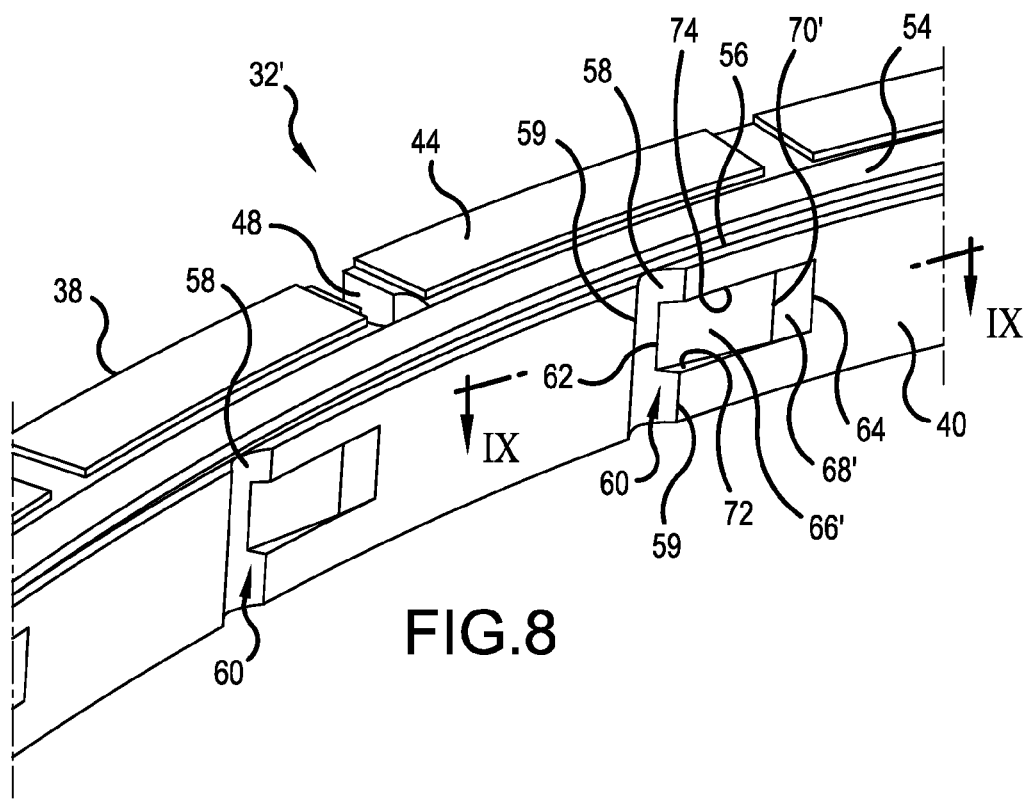
FIG. 8 is a perspective detail view of a portion of the radially inner side of a second embodiment of a seal segment according to the present disclosure.
Figure 9:
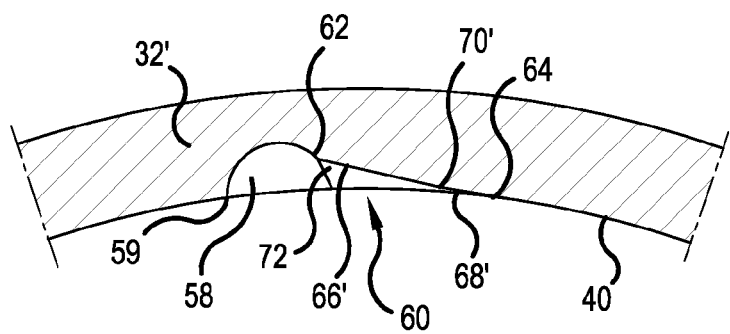
FIG. 9 is a sectional view taken along line IX-IX in FIG. 8.

A second embodiment of the present disclosure is illustrated in FIGS. 8 and 9. In these figures, elements common to the first embodiment are identified with like reference numerals and are not discussed in detail. Elements that are different than elements of the first embodiment but that correspond to elements of the first embodiment are identified with the same reference numerals as the first embodiment and a prime (') symbol. In FIG. 8, it will be seen that the first ramp 66' is circumferentially shorter than the second ramp 68; stated differently, the transition portion 70' is closer to the first end 62 of the recess 60 than to the second end 64 of the recess 60. This configuration might be preferable to the configuration of the first embodiment under some combination of operating temperatures, speeds and/or pressures.

Figure 10:
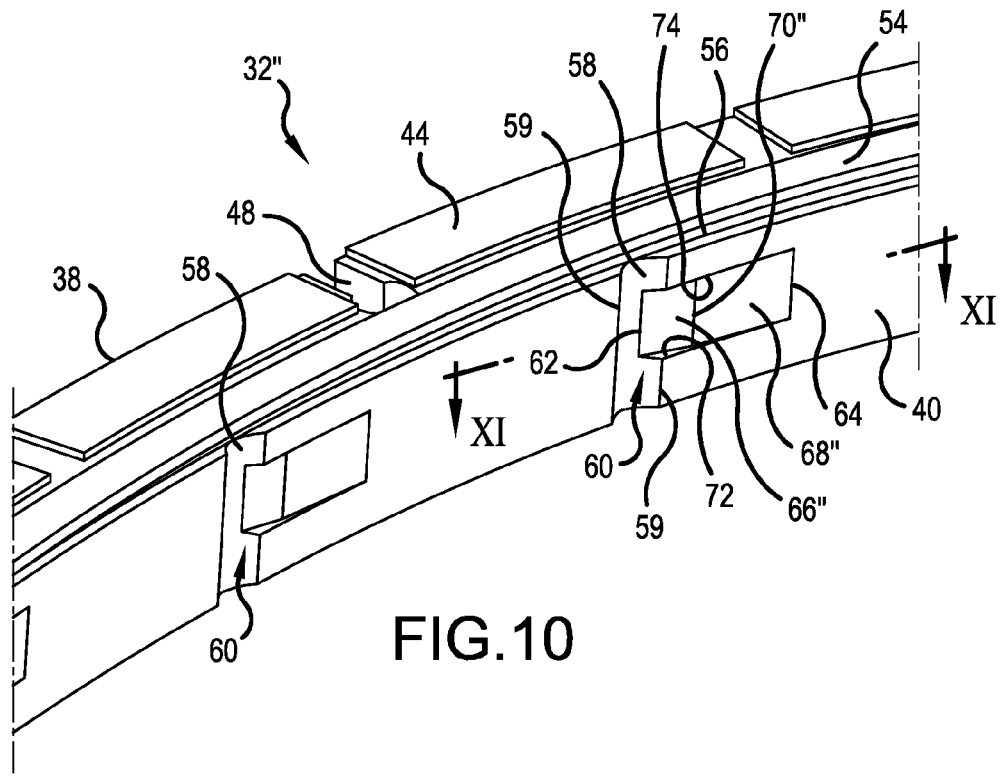
FIG. 10 is a perspective detail view of a portion of the radially inner side of a third embodiment of a seal segment according to the present disclosure.
Figure 11:
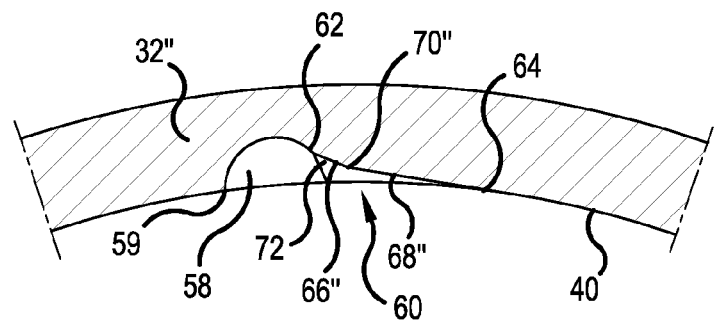
FIG. 11 is a sectional view taken along line X-X in FIG. 10.

A third embodiment of the present disclosure is illustrated in FIGS. 10 and 11. In these figures, elements common to the first embodiment are identified with like reference numerals and are not discussed in detail. Elements that are different than elements of the first embodiment but that correspond to elements of the first embodiment are identified with the same reference numeral as the first embodiment and a double prime (") symbol. In FIG. 10, it will be seen that the first ramp 66" is circumferentially longer than the second ramp 68"; stated differently, the transition portion 70" is closer to the second end 64 of the recess 60 than to the first end 62 of the recess 60. This configuration might be preferable to the configurations of the first and second embodiments under some combination of operating temperatures, speeds and/or pressures.

Figure 12:
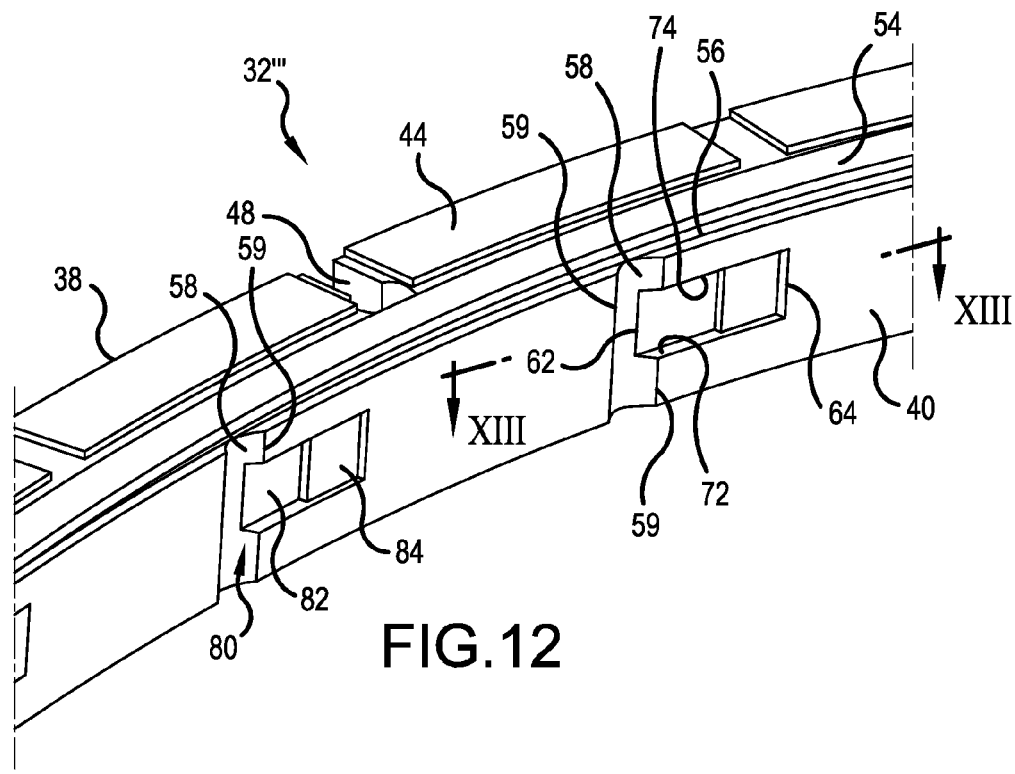
FIG. 12 is a perspective detail view of a portion of the radially inner side of a fourth embodiment of a seal segment according to the present disclosure.
Figure 13:
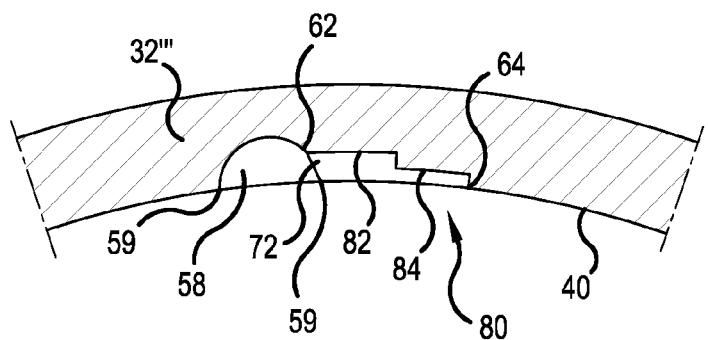
FIG. 13 is a sectional view taken along line XII-XII in FIG. 12.

A fourth embodiment of the present disclosure is illustrated in FIGS. 12 and 13. In these Figures, the seal segment 32 includes a recess 80 different than the recess 60 of the first three embodiments. Specifically, the recess 80 includes a first portion 82 and a second portion 84, and these first and second portions lie in parallel planes and have the same slope, a slope that may be (but is not necessarily) parallel to a plane tangent to the edge 59 of the feed slot 58. The first portion 82 is deeper relative to the radial inner side 40 than is the second portion 84. The depth of the first portion 82 may be expressed as a first function of distance from the recess 58, a first constant function, e.g., depth=2, while the depth of the second recess may be expressed as a second constant function different than the first function, e.g., depth=1. Thus, while the slopes of the first portion 82 and the second portion 84 may be the same, the deeper first portion 82 may provide adequate lift when liquid or condensate is present in the gap 26 while the shallower groove may provide adequate lift when all matter in the gap 26 is in a gaseous state.

The present invention has been described herein in terms of several preferred embodiments. Modifications and additions to these embodiments will become apparent to persons of ordinary skill in the art upon a reading of the foregoing disclosure. It is intended that all such modifications and additions form a part of the present invention to the extent they fall within the scope of the several claims appended hereto.

What is claimed is:

1. A circumferential shaft seal segment comprising:
   a radial outer face;
   a radial inner face;
   a first axial face extending from the radial outer face toward the radial inner face;
   a second axial face axially spaced from the first axial face and extending from the radial outer face toward the radial inner face;
   at least one feed slot in the radial inner face extending from the first axial face toward the second axial face; and
   at least one recess in the radial inner face extending from the at least one feed slot, each of the at least one recess having first and second axially spaced side walls, a bottom between the side walls, a first end at the feed slot and a second end circumferentially spaced from the feed slot,
   wherein the recess includes a first flat portion extending from the first end and a second flat portion extending from the second end,
   wherein a radial depth of the first flat portion-decreases at a first constant rate in a direction away from the feed slot, and a radial depth of the second flat portion decreases at a second constant rate in the direction away from the feed slot, and the second rate is different than the first rate, and
   wherein the first portion meets the second portion at a transition region and wherein the transition region is either equidistant from the first end and from the second end, or is closer to the second end than to the first end.

2. The circumferential shaft seal of claim 1, wherein the second rate is less than the first rate.

3. The circumferential shaft seal of claim 1, wherein the first and second axially spaced side walls extend from the feed slot toward the second end.

4. The circumferential shaft seal of claim 2, wherein the first portion meets the second portion at a transition region and wherein a recess depth change from the first end to the transition region is greater than a recess depth change from the transition region to the second end.

5. The circumferential shaft seal of claim 1, wherein exactly one of the at least one recess is associated with each of the at least one feed slot.

6. The circumferential shaft seal segment according to claim 2, wherein the radial inner face includes a circumferential channel axially inward of the second axial face, wherein the feed slot extends from the first axial face to the circumferential channel, and wherein the at least one recess is located between the circumferential channel and the first axial face.

7. The circumferential shaft seal segment according to claim 2, wherein the first portion meets the second portion at a transition region and wherein the transition region is equidistant from the first end and from the second end.

8. The circumferential seal segment according to claim 2, wherein the first portion meets the second portion at a transition region and wherein the transition region is closer to the second end than to the first end.

9. A circumferential shaft seal comprising a plurality of circumferential shaft seal segments of claim 1.

10. A shaft sealing system comprising a shaft and the circumferential shaft seal according to claim 9 mounted on the shaft, wherein the second rate is selected to provide a desired lift when a space between the shaft seal and the shaft contains no liquid and the first rate is selected to provide a desired lift when liquid is present in the space between the shaft seal.

11. A circumferential shaft seal segment comprising:
    a radial outer face;
    a radial inner face;
    a first axial face extending from the radial outer face toward the radial inner face;
    a second axial face axially spaced from the first axial face and extending from the radial outer face toward the radial inner face; at least one feed slot in the radial inner face extending from the first axial face toward the second axial face; and
    at least one ramp in the radial inner face extending from the at least one feed slot, each of the at least one ramp having first and second axially spaced side walls, a bottom between the side walls, a first end at the feed slot and a second end circumferentially spaced from the feed slot,
    wherein the at least one ramp includes a first flat ramp portion extending from the first end and a second flat ramp portion extending from the second end,
    wherein the first flat ramp portion has a first constant slope in a direction from the first end toward the second end and the second flat ramp portion has a second constant slope in the direction from the first end toward the second end different than the first slope,
    wherein a radial depth of the first flat ramp portion decreases at a first constant rate in a direction away from the first end and a radial depth of the second flat ramp portion increases at a second constant rate in the direction away from the second end, the second constant rate is different than the first constant rate and
    wherein the first portion meets the second portion at a transition region and wherein the transition region is either equidistant from the first end and from the second end, or is closer to the second end than to the first end.

12. The circumferential shaft seal of claim 11, wherein the first rate is greater than the second rate.

13. The circumferential shaft seal of claim 11, wherein the first ramp portion meets the second ramp portion at a transition region and wherein a recess depth change from the first end to the transition region is greater than a recess depth change from the transition region to the second end.

14. The circumferential shaft seal segment according to claim 11, wherein the first flat ramp portion meets the second flat ramp portion at a transition region and wherein the transition region is equidistant from the first end and from the second end.

15. The circumferential seal segment according to claim 11, wherein the first flat ramp portion meets the second flat ramp portion at a transition region and wherein the transition region is closer to the second end than to the first end.

* * * * *